US 6,647,271 B1

(12) United States Patent
Doi

(10) Patent No.: US 6,647,271 B1
(45) Date of Patent: Nov. 11, 2003

(54) TRANSMISSION CHANNEL ALLOCATION METHOD AND RADIO APPARATUS USING THE SAME

(75) Inventor: Yoshiharu Doi, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/532,773

(22) Filed: Mar. 22, 2000

(30) Foreign Application Priority Data

Mar. 24, 1999 (JP) ........................................... 11-080071

(51) Int. Cl.$^7$ ................................................ H04Q 7/20
(52) U.S. Cl. ...................... 455/464; 455/509; 455/510
(58) Field of Search ................................ 455/101, 464, 455/509, 510, 500, 63, 561, 132, 450, 452, 454; 370/332, 335, 328, 329, 330, 342, 431, 436, 418; 342/380; 375/142, 144, 148, 150, 324

(56) References Cited

U.S. PATENT DOCUMENTS

| | | | | |
|---|---|---|---|---|
| 5,602,507 A | * | 2/1997 | Suzuki ........................ | 329/304 |
| 5,687,171 A | * | 11/1997 | Shin et al. ................... | 370/335 |
| 5,886,988 A | * | 3/1999 | Yun et al. .................... | 370/329 |
| 5,898,928 A | * | 4/1999 | Karisson et al. ............. | 455/450 |
| 5,963,865 A | * | 10/1999 | Desgagne et al. ........... | 455/450 |
| 5,982,327 A | * | 11/1999 | Vook et al. .................. | 342/380 |
| 6,041,237 A |  | 3/2000 | Farsakh ....................... | 455/450 |

FOREIGN PATENT DOCUMENTS

| | | |
|---|---|---|
| DE | 197 13 666 | 4/1997 |
| FR | 2 738 098 | 2/1997 |
| JP | 7-505017 | 6/1995 |
| JP | 08265832 | 10/1996 |
| JP | 11-032030 | 2/1999 |
| WO | WO 93/12590 | 6/1993 |
| WO | 98/30047 | 7/1998 |

OTHER PUBLICATIONS

Tanaka et al., "Blocking Rate Performance of SMDA with a 3–element Adaptive Array", *Technical Report of Institute of Electric Information and Communication Engineers*, vol. 97, No. 549, pp. 95–100.

Copy of Japanese Office Action Communication for corresponding Japasnese Patent Application No. 11–080071 dated Aug. 21, 2001.

Copy of European Patent Office Communication including European Search Report for corresponsing European Patent Application 00106344 dated Nov. 3, 2000.

* cited by examiner

*Primary Examiner*—Nguyen T. Vo
*Assistant Examiner*—C. Chow
(74) *Attorney, Agent, or Firm*—Armstrong, Westerman & Hattori, LLP

(57) ABSTRACT

In a transmission/reception system, adaptive arrays separate signals from users by multiplying radio wave signals received through array antennas by reception signal weight vectors. A reception signal coefficient vector calculator preliminary calculates a reception signal vector of a U wave and produces a table in a memory. If a cross correlation value of the reception signal vector of the U wave and the reception signal vector of a user newly requesting connection is smaller than a prescribed value, a channel can be allocated to the newly requesting user even if the U wave level per se is high.

5 Claims, 17 Drawing Sheets

D WAVE (f1 IS NOT OK)

TRANSMISSION CHANNEL ALLOCATION METHOD AND RADIO APPARATUS USING THE SAME

BACKGROUND OF THE INVENTION

1. Field of the Invention

The present invention relates to transmission channel allocation methods and radio apparatuses using the same. More particularly, the present invention relates to a transmission channel allocation method and a radio apparatus using the same for allocating a channel to be used for transmission to a user requesting connection in a PDMA (Path Division Multiple Access) communication system where a plurality of users transmit and receive data such as audio and video using channels of the same frequency and the same time.

2. Description of the Background Art

In a conventional portable telephone system such as PHS (Personal Handy phone System), when a plurality of users request connection to a base station, determination is made as to whether a user is connected in accordance with a desired wave level of a radio wave from the requesting user and an undesired wave level of a radio wave of the other user.

FIGS. 13 and 14 are schematic diagrams shown in conjunction with a channel allocation method of a conventional portable telephone system.

FIG. 13 relates to the case where the undesired wave level is too high to enable connection of the newly requesting user (hereinafter referred to as a newly requesting user) in the conventional portable telephone system.

First, for example, at a base station CS1, undesired wave levels (hereinafter referred to as U wave levels) to a slot which is not connected (not allocated to a user) at all frequencies are measured in advance. Then, a table showing a relationship between each of the frequencies and the U wave level is produced.

If a user PS2 newly requests connection, base station CS1 measures a desired wave level (hereinafter referred to as a D wave level) of user PS2. If a ratio of D wave level to the U wave level (hereinafter referred to as a D/U ratio) is equal to or smaller than a prescribed value at a given frequency (f1 in FIG. 13), that frequency cannot be used for communication with user PS2.

On the other hand, FIG. 14 relates to the case where the U wave level is low enough to allow connection of the newly requesting user in the conventional portable telephone system. If the D/U ratio in the above mentioned table is at least the prescribed value, base station CS1 uses the frequency for communication with newly requesting user PS2.

The above described communication channel allocation method suffers from the problem that communication cannot be established with the base station through a channel if the other user is in communication with another base station which is located near the present base station.

Recently, in the field of the mobile communication systems, various transmission channel allocation methods have been proposed to effectively use the frequencies. Some of the methods are actually in practice.

FIG. 15 is a diagram showing arrangements of channels in various communication systems of Frequency Division Multiple Access (FDMA), Time Division Multiple Access (TDMA), and PDMA.

Referring first to FIG. 15, the systems of FDMA, TDMA, and PDMA will be briefly described. FIG. 15(a) relates to the FDMA system, where analog signals of users 1–4 are frequency-divided to be transmitted in radio waves of different frequencies f1–f4. The signals of users 1–4 are separated by frequency filters.

In the TDMA system shown in FIG. 15(b), the digitized signals of respective users are time-divided and transmitted in radio waves of different frequencies f1–f4 at every constant period of time (time slot). The signals of respective users are separated by frequency filters and by time synchronization between a base station and a mobile terminal device of each user.

Recently, the PDMA system has been proposed to improve the radio wave frequency usability to comply with the proliferation of portable telephones. In the PDMA system shown in FIG. 15(c), one time slot of the same frequency is spatially divided to transmit data of a plurality of users. In this system, signals of respective users are separated by frequency filters, time synchronization between a base station and a mobile terminal device of each user, and interference canceller such as adaptive arrays.

FIG. 16 is a schematic block diagram showing a transmission/reception system 2000 of a conventional base station for PDMA.

In the structure shown in FIG. 16, four antennas #1 to #4 are provided to distinguish between users PS 1 and PS 2.

In a reception operation, outputs of respective antennas are applied to RF circuit 101, where they are amplified by a reception amplifier and subjected to frequency conversion by local oscillation signals. Thereafter, any unwanted frequency signal is eliminated by a filter. Further, the signals are subjected to A/D conversion to be applied to a digital signal processor 102 as digital signals.

Digital signal processor 102 includes a channel allocation standard calculator 103, a channel allocation apparatus 104, and an adaptive array 100. Channel allocation standard calculator 103 preliminary calculates to determine if the signals from two users can be separated by the adaptive array. Based on the calculation result, channel allocation apparatus 104 provides to adaptive array 100 channel allocation information including user information for selection of the frequency and time. Adaptive array 100 separates the signal of a particular user by performing in real time a weighting operation on signals from four antennas #1 to #4 in accordance with the channel allocation information.

[Structure of Adaptive Array Antenna]

FIG. 17 is a block diagram showing a structure of a transmitting/receiving portion 100a corresponding to one user in adaptive array 100. Referring to FIG. 17, n input ports 20-1 to 20-n are arranged for extracting the signal of an intended user from input signals including a plurality of user signals.

The signals input to respective input ports 20-1 to 20-n are applied to a weight vector controlling portion 11 and multipliers 12-1 to 12-n through switch circuits 1-1 to 10-n.

Weight vector controlling portion 11 calculates to obtain weight vectors $w_{1i}$–$w_{ni}$ using the input signals, a training signal corresponding to a particular user signal which has preliminary been stored in a memory 14, and an output from an adder 13. Here, a subscript i indicates that the weight vector is used for transmission/reception with respect to the ith user.

Multipliers 12-1 to 12-n respectively multiply the input signals from input ports 20-1 to 20-n and weight vectors $w_{1i}$–$w_{ni}$ for application to adder 13. Adder 13 adds output signals from multipliers 12-1 to 12-n for output as a reception signal $S_{RX}$ (t), which is also applied to weight vector controlling portion 11.

Further, transmitting/receiving portion 100a includes multipliers 15-1 to 15-n receiving an output signal $R_{TX}$ (t) from the adaptive array of the radio base station and multiplying it by each of $w_{1i}$–$w_{ni}$ that have been applied from weight vector controlling portion 11 for output. Outputs form multipliers 15-1 to 15-n are applied to switch circuits 10-1 to 10-n. In other words, switch circuits 10-1 to 10-n provide signals applied from input ports 20-1 to 20-n to a signal receiving portion 1R for signal reception, and provide signals from a signal transmitting portion IT to input/output ports 20-1 to 20-n for signal transmission.

[Operation Principle of Adaptive Array]

Now, the operation principle of transmitting/receiving portion 100a shown in FIG. 17 will be briefly described.

In the following, for simplification of the description, assume that four antenna elements are provided and two users PS are in connection at the same moment. Then, signals applied from respective antennas to receiving portion 1R are represented by the following equations.

$$RX_1(t)=h_{11}Srx_1(t)+h_{12}Srx_2(t)+n_1(t) \quad (1)$$

$$RX_2(t)=h_{21}Srx_1(t)+h_{22}Srx_2(t)+n_2(t) \quad (2)$$

$$RX_3(t)=h_{31}Srx_1(t)+h_{32}Srx_2(t)+n_3(t) \quad (3)$$

$$RX_4(t)=h_{41}Srx_1(t)+h_{42}Srx_2(t)+n_4(t) \quad (4)$$

Here, a signal $RX_j$ (t) is a reception signal of the jth (j=1, 2, 3, 4) antenna, whereas signal $Srx_i$ (t) is transmitted from the ith (i=1, 2) user.

Further, a coefficient $h_{ji}$ represents a complex coefficient of the signal from the ith user received by the jth antenna, whereas $n_j$ (t) represents a noise included in the jth reception signal.

The above equations (1) to (4) can be placed into vector formats as follows.

$$X(t)=H_1Srx_1(t)+H_2Srx_2(t)+N(t) \quad (5)$$

$$X(t)=[RX_1(t), RX_2(t), \ldots, RX_n(t)]^T \quad (6)$$

$$H_i=[h_{1i}, h_{2i}, \ldots, h_{ni}]^T, (i=1, 2) \quad (7)$$

$$N(t)=[n_1(t), n_2(t), \ldots, n_n(t)]^T \quad (8)$$

It is noted that $[\ldots]^T$ is the transposition of $[\ldots]$ in the equations (6) to (8).

Here, X (t) is an input signal vector, $H_i$ is a reception signal coefficient vector of the ith user, and N (t) is a noise vector.

With reference to FIG. 15, the adaptive array antenna outputs, as reception signal $S_{RX}$ (t), the signal obtained by multiplying input signals of respective antennas by weight coefficients $w_{1i}$–$w_{ni}$ and adding them together. It is noted that there are four antennas in this example.

The operation of the adaptive array in the above described environment, for example when a signal $S_{rx1}$ (t) transmitted by the first user is extracted, is as follows.

An output signal y1 (t) from adaptive array 100 can be represented by the following equation that is obtained by multiplying input signal vector X (t) by weight vector $W_1$.

$$y1(t)=X(t)W_1^T \quad (9)$$

$$W_1=[w_{11}, w_{21}, w_{31}, w_{41}]^T \quad (10)$$

In other words, weight vector $W_1$ has weight coefficients $w_{j1}$ (j=1, 2, 3, 4) to be multiplied by jth input signal $RX_j$ (t).

By substituting input signal vector X (t) of equation (5) into equation (9), the following equation is obtained.

$$y1(t)=H_1W_1^TSrx_1(t)+H_2W_1^TSrx_2(t)+N(t)W_1^T \quad (11)$$

Here, if adaptive array 100 operates favorably, weight vector $W_1$ is sequentially controlled by weight vector controlling portion 11 to satisfy the following simultaneous equation in accordance with a well-known method.

$$H_1W_1^T=1 \quad (12)$$

$$H_2W_1^T=0 \quad (13)$$

When weight vector $W_1$ is perfectly controlled to satisfy the above equations (12) and (13), output signal y1 (t) from adaptive array 100 will eventually be represented by the following equation.

$$y1(t)=Srx_1(t)+N_1(t) \quad (14)$$

$$N_1(t)=n_1(t)w_{11}+n_2(t)w_{21}+n_3(t)w_{31}+n_4(t)w_{41} \quad (15)$$

More specifically, signal $Srx_1$ (t) that has been transmitted by the first of the two users is obtained for output signal y1 (t).

On the other hand, referring to FIG. 15, input signals $S_{TX}$ (t) to adaptive array 100 is applied to transmitting portion 1T of adaptive array 100 and applied to one inputs of multipliers 15-1 to 15-n. The other inputs of the multipliers are supplied with copies of weight vectors $w_{1i}$–$w_{ni}$, which have been obtained by calculation in accordance with reception signals by weight vector controlling portion 11 as described above.

The input signals that have been weighted by the multipliers are transmitted to corresponding antennas #1 to #n through corresponding switches 10-1 to 10-n to be further transmitted.

Here, users PS1 and PS2 are distinguished as follows. Namely, radio signals from portable telephones are transmitted in frame configurations. The radio signal from the portable telephone mainly includes a preamble of a signal sequence known to the radio base station, and data (such as audio) of a signal sequence unknown to the radio base station.

The signal sequence of the preamble includes a signal column of information for determining if the user is desirable for the radio base station to communicate. Weight vector controlling portion 11 of adaptive array of radio base station 1 compares a training signal corresponding to user A that is obtained from memory 14 and the received signal sequence for performing weight vector control (determination of weighting coefficient) to extract a signal which is likely to include the signal sequence corresponding to user PS1.

Recently, due to the rapid proliferation of portable telephones, the usability of channels is now approaching its limit. In the future, it is expected that allocation requests from users would exceed the number of available transmission channels. To meet the situation, channel allocation must be performed while effectively utilizing empty channels in the above described mobile communication system for PDMA.

In the above described PDMA system, one time slot of the same frequency is spatially divided to transmit data of a plurality of users. Thus, a transmission channel must be allocated to each user such that interference among signals is eliminated by time synchronization between the base station and a mobile terminal device of each user. Then, it becomes difficult to maintain a sufficient communication quality unless allocation is performed to sufficiently reduce the interference among the plurality of users.

SUMMARY OF THE INVENTION

An object of the present invention is to provide a transmission channel allocation method capable of efficiently allocating a transmission channel to a user who is requesting connection (hereinafter referred to as a newly requesting user) while reducing interference between signals, and to a radio apparatus using the same.

In short, the present invention is a method of allocating transmission channels to respective terminal devices for multiple connection to a base station having array antennas in response to connection requests from a plurality of terminal devices, including a step of measuring a reception signal coefficient vector of an undesired wave (a U wave) for a preliminary multiplexed slot and producing a table of U wave levels, and a step of allocating a transmission channel from empty transmission channels to a newly requesting user in accordance with a magnitude of cross correlation of a reception signal of the undesired wave and a reception signal of the newly requesting user.

According to another aspect, the present invention is a method of allocating transmission channels to respective terminal devices for multiple connection to a base station having array antennas in response to connection requests from a plurality of terminal devices, including a step of measuring a reception signal coefficient vector and a U wave level for a preliminary multiplexed slot and generating a table of the U wave levels, and a step of allocating a transmission channel from empty transmission channels to a newly requesting user in accordance with a magnitude of cross correlation of a reception signal of the U wave and a reception signal from the newly requesting user as well as a ratio of the U wave level and a reception signal level of the newly requesting user.

According to still another aspect, the present invention is a radio apparatus for performing path-divided multiple connection with respect to a plurality of terminal devices, including array antennas, a plurality of reception signal separating portions, a reception signal coefficient vector calculating portion, a storing portion, and a channel allocating portion.

The plurality of reception signal separating portions separate reception signals in real time by multiplying reception weight vectors of terminal devices by reception signals from the array antennas.

The reception signal coefficient vector calculating portion measures reception signal coefficient vectors of a U wave and reception waves from respective terminal devices for a multiplexed slot.

The storing portion stores a table of the reception signal coefficient vectors of the U wave.

The channel allocating portion allocates a transmission channel from empty transmission channels to a newly requesting user in accordance with a magnitude of cross correlation of the reception signal coefficient vector of the U wave and the reception signal coefficient vector of the newly requesting user.

According to still another aspect, the present invention is a radio apparatus for performing path-divided multiple connection with respect to a plurality of terminal devices including array antennas, a plurality of reception signal separating portions, a reception signal coefficient vector calculating portion, a storing portion, and a channel allocating portion.

The plurality of reception signal separating portions separate reception signals in real time by multiplying reception weight vectors for respective terminal devices by reception signals from the array antennas.

The reception signal coefficient vector calculating portion measures a U wave and reception signal coefficient vectors of a U wave and reception waves from respective terminal devices for a multiplexed slot.

The reception signal power calculating portion derives reception signal power of each terminal device and reception signal power of the U wave.

The storing portion stores a table of the reception signal coefficient vector of the U wave and a table of the reception signal power of the U wave.

The channel allocating portion allocates a transmission channel from empty transmission channels to a newly requesting user in accordance with a magnitude of cross correlation of the reception signal coefficient vector of the U wave and the reception signal coefficient vector of the newly requesting user as well as a ratio of a U wave power level and the reception signal power level of the newly requesting user.

Therefore, a main advantage of the present invention is that the channel is allocated to the newly requesting user for which path multiplex connection is attained without difficulty in terms of a base station, so that the transmission channel can be allocated to the newly requesting user even when the U wave level per se is high. Therefore, a transmission channel allocation method capable of improving transmission channel usability is provided.

Another advantage of the present invention is that a radio apparatus is provided which is capable of allocating a transmission channel to a newly requesting user and improving transmission channel usability even when the U wave level is high since the channel is allocated to a newly requesting user for which path multiplex connection is attained without difficulty in terms of the base station.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

[Structure of Transmission/Reception System 1000]

Figure 1:
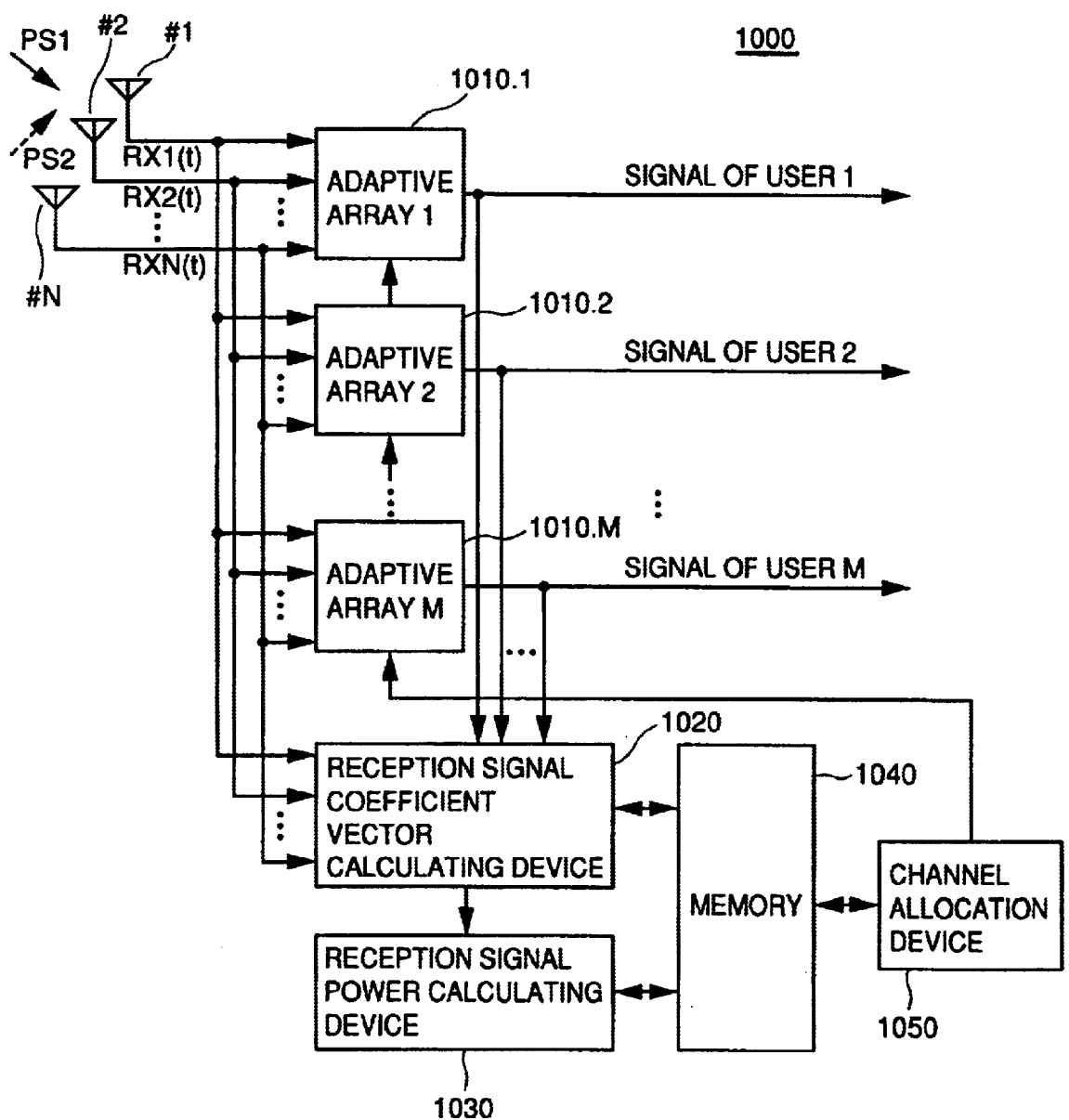
FIG. 1 is a schematic block diagram showing a structure of a radio apparatus 1000 according to a first embodiment of the present invention.

FIG. 1 is a schematic block diagram showing a structure of transmission/reception system 1000 of a base station for PDMA.

In the structure shown in FIG. 1, N (N: natural number) antennas #1 to #N are arranged for distinguishing between users PS1 and PS 2.

Figure 17:
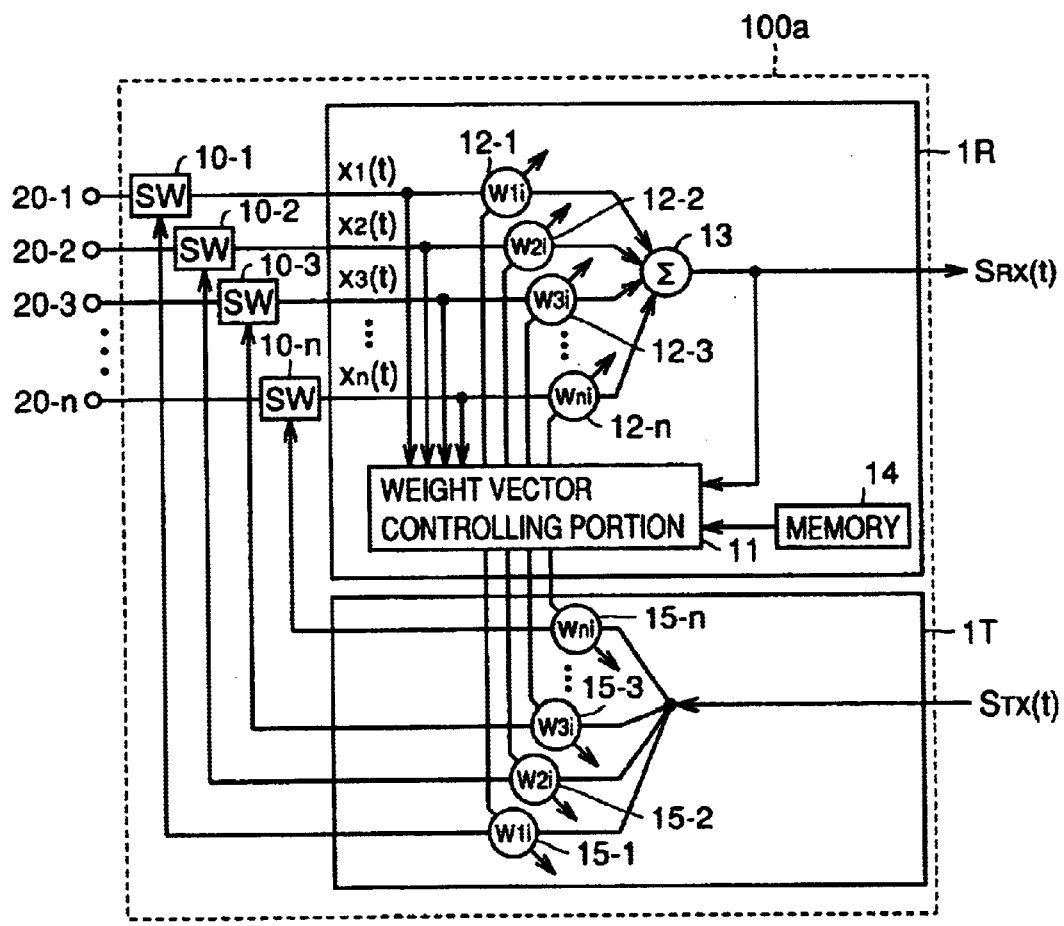
FIG. 17 is a block diagram showing a structure of transmitting/receiving portion 100a for one user of adaptive array 100.

Transmission/reception system 1000 includes adaptive arrays 1010.1 to 1010.M respectively receiving signals from antennas #1 to #N for separation of signals from corresponding users. The structures of adaptive arrays 1010.1 to 1010.M are similar to those of conventional adaptive arrays shown in FIG. 17.

Transmission/reception system 1000 further includes: a reception signal coefficient vector calculating device 1020 receiving signals from #1 to #N and output signals from adaptive arrays 1010.1 to 1010.M for calculating reception signal coefficient vectors; a reception signal power calculating device 1030 calculating reception signal power of every channel based on the reception signal coefficient vector that has been derived from reception signal coefficient vector calculating device 1020; a memory 1040 for storing and holding the reception signal coefficient vector of every user and every empty channel; and a channel allocation device 1050 for allocating channels in accordance with the reception signal coefficient vector stored in memory 1040.

More specifically, in memory 1040, a table of reception signal coefficient vectors of the U wave for the empty channels is stored as will later be described.

Channel allocation device 1050 provides to adaptive arrays 1010.1 to 1010.M channel allocation information including user information for selection of frequency and time in accordance with the table of reception signal coefficient vectors of the U wave.

Adaptive arrays 1010.1 to 1010.M separate only signals from a particular user by performing in real time weighting calculations on signals from antennas #1 to #N in accordance with the channel allocation information.

The values of reception signal coefficient vectors stored in the above described memory 1040 are updated as necessary.

[Brief Description of Operation of Transmission/Reception System 1000]

Figure 2:
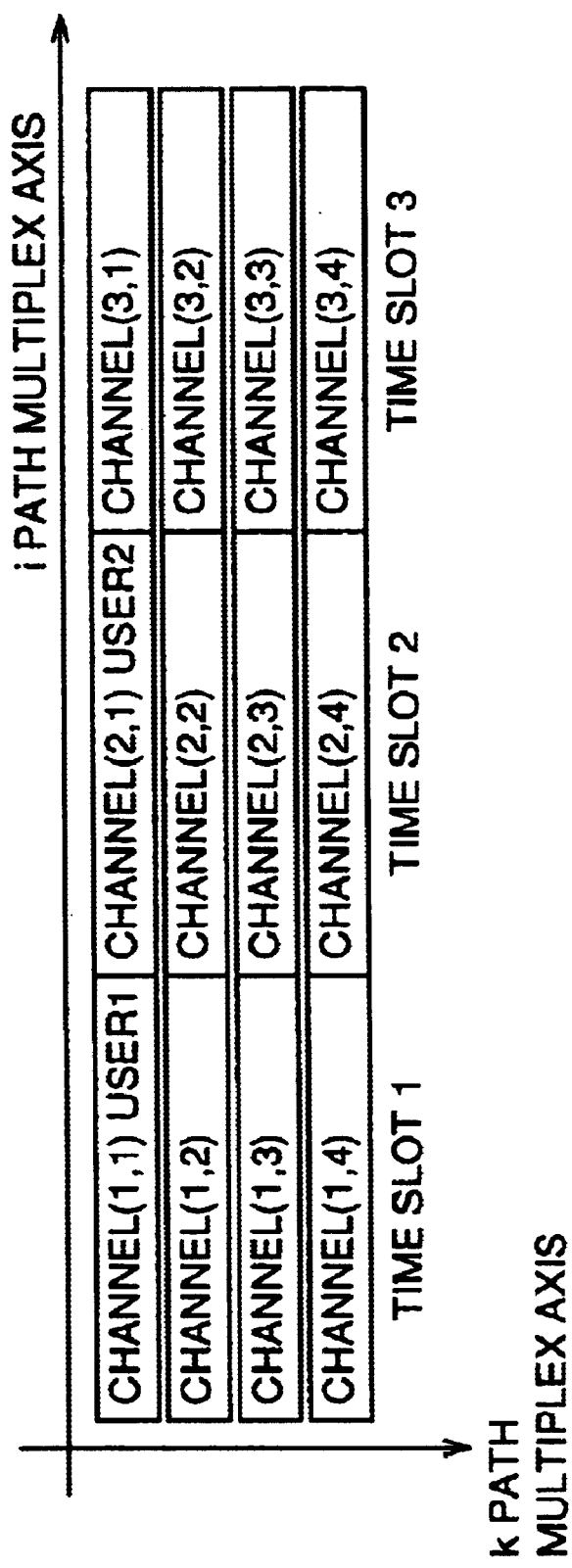
FIG. 2 is a diagram showing an arrangement of channels in a PDMA system.

FIG. 2 is a diagram showing arrangements of channels in the PDMA system. Referring to FIG. 2, a path multiplex degree is four and there are three time slots, so that there are channels (1, 1) to (3, 4), i.e., twelve channels in total.

Referring to FIG. 2, first, a communication channel is established with respect to one user, and the first user is allocated to channel (1, 1).

Figure 3:
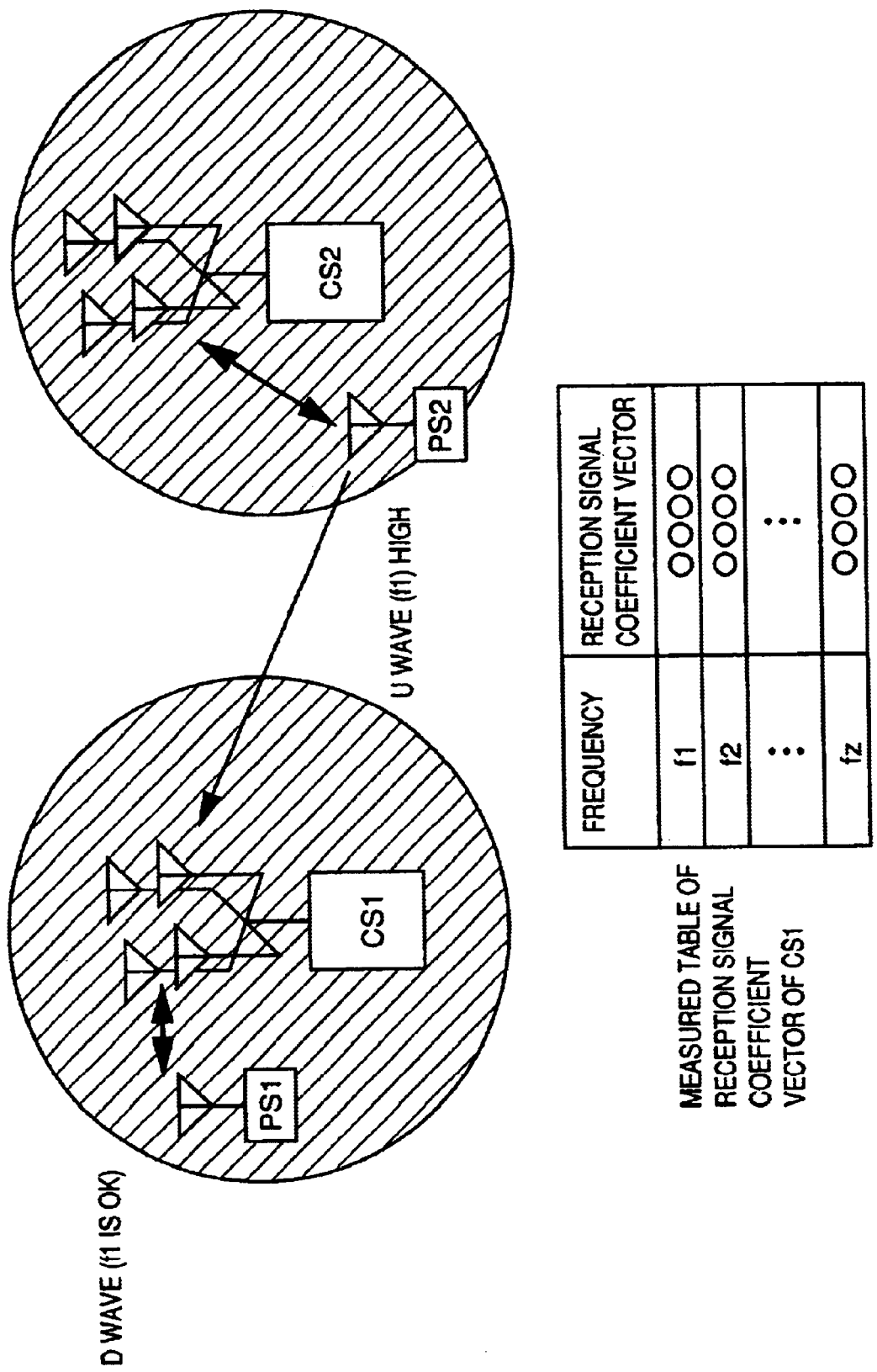
FIG. 3 is a schematic diagram shown in conjunction with a channel allocation method according to a first embodiment of the present invention.

FIG. 3 is a schematic diagram shown in conjunction with a channel allocation method according to the first embodiment of the present invention.

More specifically, base station CS1 provided with transmission/reception system 1000 preliminary measures reception signal vectors of a U wave at all frequencies allowing connection coming to the station and produces a table using a slot not used for communication.

Base station CS1 measures a reception signal vector of user PS1 newly requesting connection and allocates, to communication with new user PS1, a channel of a reception signal vector of which cross correlation value with respect to the reception signal vector of PS1 being equal to or smaller than a prescribed value.

With such channel allocation, even when there is a user PS2 in communication with another base station CS2 near base station CS1 and the U wave level caused by user PS2 is high, if a magnitude of cross correlation of reception signal coefficient vector of a desired wave (hereinafter referred to as a D wave) from new user PS1 to base station CS1 and reception signal coefficient vector of the U wave from user PS2 to base station CS1 is large, user PS1 can communicate with base station CS1 through the channel.

More specifically, when channel allocation is performed in accordance only with D/U ratio, the channel which is not subjected to channel allocation can be used, so that usability of the channels increases.

[Operation of Reception Signal Coefficient Vector Calculator 1020]

Before the description of channel allocation method of the first embodiment is given, the operation of a reception signal coefficient vector calculator 1020 shown in FIG. 1 will be described.

If there are four antenna elements and two users in communication at the same moment, signals output from the reception circuit via respective antennas are represented by the above mentioned equations (1) to (4).

Then, if reception signals of the antennas represented by equations (1) to (4) are rewritten in vector formats, the following equations (5) to (8) are obtained.

$$X(t)=H_1 Srx_1(t)+H_2 Srx_3(t)+N(t) \quad (5)$$

$$X(t)=[RX_1(t), RX_2(t), \ldots, RX_n(t)]^T \quad (6)$$

$$H_i=[h_{1i}, h_{2i}, \ldots, h_{ni}]^T, (i=1, 2) \quad (7)$$

$$N(t)=[n_1(t), n_2(t), \ldots, n_n(t)]^T \quad (8)$$

Here, if the adaptive arrays operate favorably, the signals from users are separated and extracted, so that all of the above mentioned signals $Srx_i(t)$ (i=1, 2) have known values.

Then, by utilizing the fact that signals $Srx_i(t)$ (i=1, 2) have known values, the following reception signal vectors $H_1=[h_{11}, h_{21}, h_{31}, h_{41}]$ and $H_2=[h_{12}, h_{22}, h_{32}, h_{42}]$ can be derived.

More specifically, the reception signal is multiplied by a known user signal, for example, signal $Srx_1(t)$ from the first user, to obtain an ensemble average (a time average).

$$E[X(t)\cdot Srx_1^*(t)]=H_1\cdot E[Srx_1(t)\cdot Srx_1^*(t)]+H_2\cdot E[Srx_2(t)\cdot Srx_1^*(t)]+E[N(t)\cdot Srx_1^*(t)] \quad (16)$$

In equation (16), E[ . . . ] represents a time average and S*(t) represents a conjugate complex S (t). If the average is measured over a sufficient period of time, the following average value is obtained.

$$E[Srx_1(t)\cdot Srx_1^*(t)]=1 \quad (17)$$

$$E[Srx_2(t)\cdot Srx_1^*(t)]=0 \quad (18)$$

$$E[N(t)\cdot Srx_1^*(t)]=0 \quad (19)$$

The value of equation (18) is 0 because there is no cross correlation of signals $Srx_1(t)$ and $Srx_2(t)$. Similarly, the value of equation (19) is 0 because there is no cross correlation of signal $Srx_1(t)$ and a noise signal N (t).

As a result, as shown below, the ensemble average of equation (16) equals to reception signal coefficient vector $H_1$.

$$E[X(t)\cdot Srx_1^*(t)]=H_1 \quad (20)$$

With the above described procedure, reception signal coefficient $H_1$ transmitted from first user PS1 can be measured.

Similarly, for example, by calculating an ensemble average of input signal vector X (t) and signal $Srx_2(t)$, reception signal coefficient vector $H_2$ of the signal transmitted from second user PS2 can be measured.

In addition, for example, if the above mentioned second user PS2 is in communication with the other station, $H_2$ is the reception signal coefficient vector of the U wave to base station CS1.

[Operation of Producing Table of Reception Signal Coefficient Vectors of U Wave]

Figure 4:
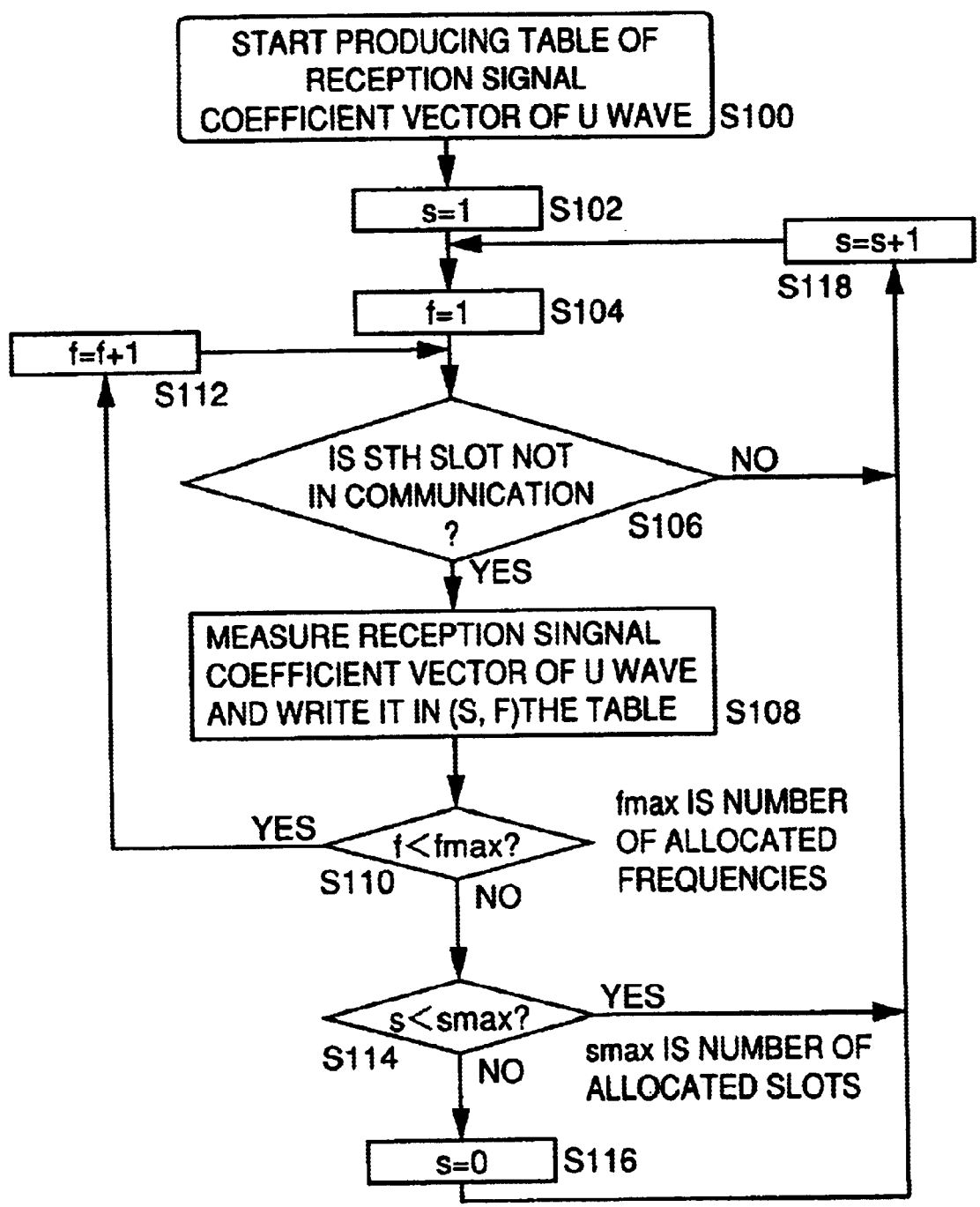
FIG. 4 is a timing chart shown in conjunction with a process of producing a table of a reception signal coefficient vectors of the U wave at a base station CS1.

FIG. 4 is a timing chart shown in conjunction with a process of producing a table of reception signal coefficient vectors of the U wave at base station CS1.

In the following, frequencies that can be allocated for communication are numbered at base station CS1. Assume that each frequency is multiplexed in a direction of time axis as shown in FIG. 2. At each frequency, time slots are sequentially numbered, and the channel designated by the frequency number and the number in the direction of the time axis is simply referred to as a slot.

As described below, when a slot that is connectable to a newly requesting user is found, a process of allocating one of the path-multiplexed channels to the newly requesting user is performed.

When the process of producing reception signal coefficient vectors of the U wave is started (step S100), a value of pointer variant s indicating the slot number is reset at 1 (step S102).

Successively, a value of variant f indicating the frequency number is reset at 1 (step S104), and determination is made as to whether sth slot is in communication (step S106).

i) When the sth channel is not in communication at a frequency denoted by frequency number f When the sth slot is not in communication (step S106), reception signal coefficient calculator 1020 measures a reception signal coefficient vector of the U wave for the slot with slot number s and frequency number f, and writes the result to the (s, f)th table in memory 1040 (step S108).

If pointer variant f is smaller than number fmax of the allocated frequencies (step S110), variant f is incremented by 1 (step S112), and the process returns to step S106.

If pointer variant f is equal to or greater than number fmax of allocated frequencies (step S110), variant s is compared with number smax of slots that are allocated to respective frequencies (step S114). If variant s is smaller than the maximum number smax of slots, variant s is incremented by 1 (step S118), and the process returns to step S104.

If variant s is equal to or greater than maximum number smax of slots, variant s is reset at 0 (step S116) and further incremented by 1 (step S118), and then the process returns to step S104.

ii) When sth slot is in communication at a frequency denoted by frequency number f If the sth slot is in communication (step S106), variant s is incremented by 1 (step S118), and the process returns to step S104.

The above described process is suitably performed for example as an interruption process, so that a table of reception signal coefficient vectors of the U wave is produced at base station CS1 and suitably updated.

[Operation of Channel Allocation Device 1050]

Figure 5:
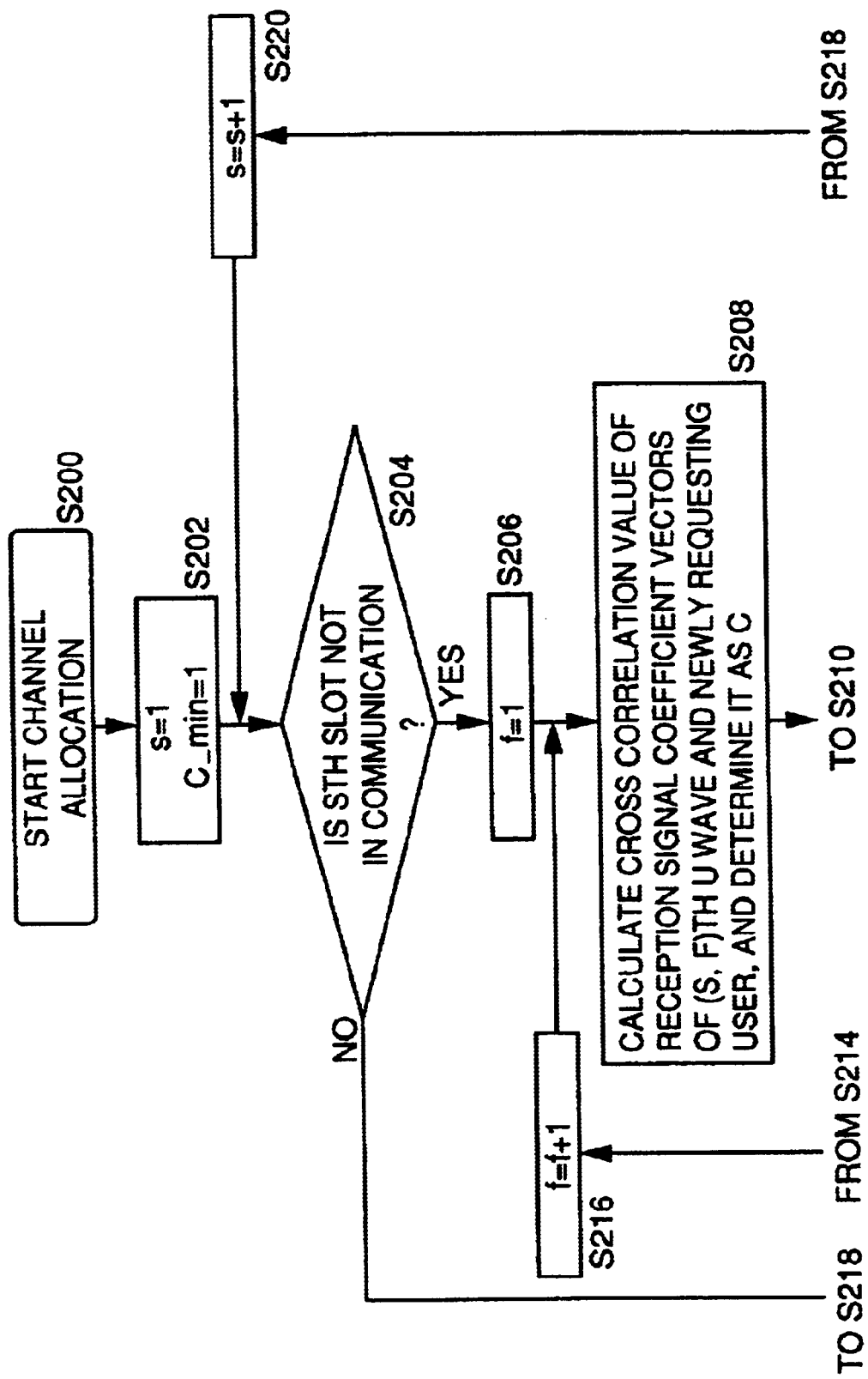
FIG. 5 is a first flow chart shown in conjunction with an operation of a channel allocation device 1050 according to the first embodiment.
Figure 6:
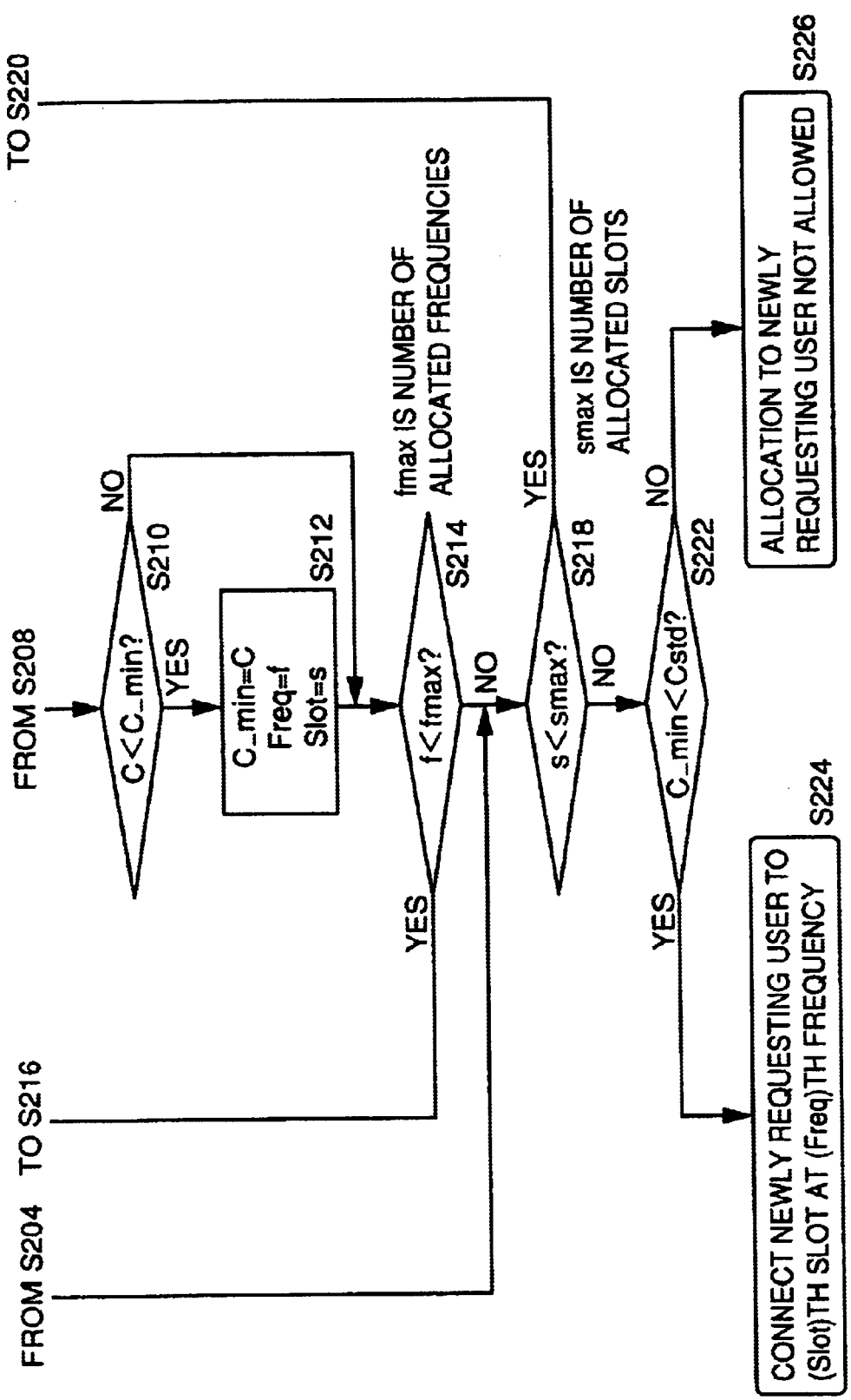
FIG. 6 is a second flow chart shown in conjunction with the operation of channel allocation device 1050 according to the first embodiment.

FIGS. 5 and 6 are flow charts shown in conjunction with the operation of channel allocation device 1050 shown in FIG. 1.

Referring to FIGS. 5 and 6, when a channel allocation operation is started (step S200), first, channel allocation device 1050 initializes the value of pointer variant s indicating the slot that is possibly subjected to channel allocation at 1 (step S200), and initializes a value of a variant C_min at 1 (step S202).

i) When the sth slot is not in communication

Successively, when the sth slot is not in communication (step S204), the value of pointer variant f indicating a frequency that is possibly connected is reset at 1 (step S206).

Thereafter, a cross correlation value C of reception signal coefficient vector $UH_{(s,f)}$ of the U wave for the (s, f)th slot and reception signal coefficient vector Hn of the newly requesting user is calculated in accordance with the following equation (step S208).

$$C=|(UH_{(s,f)}\cdot Hn)|/(|UH_{(s,f)}|\cdot |Hn|)$$

Here, (X·Y) represents an inner product of vectors X and Y, and |X| represents a magnitude of vector X.

Next, the value of cross correlation value C and variant C_min are compared (step S210).

If cross correlation value C is smaller than variant C_min (step S210), variant C_min is replaced by cross correlation value C, so that pointer variant f is input as variant Freq indicating the frequency to be connected and pointer variant s is input as variant Slot indicating the slot to be connected (step S212). On the other hand, when cross correlation value C is equal to or greater than C_min (step S210), the process proceeds to step S214.

When cross correlation value C is smaller than C_min (step S210), successively, if pointer variant f is smaller than number fmax of allocated frequencies (step S214), variant f is incremented by 1 (step S216), and the process returns to step S208.

If pointer variant f is equal to or greater than number fmax of allocated frequencies (step S214), variant s is compared with the maximum number smax of slots allocated to each frequency (step S218). If variant s is smaller than the maximum number smax of slots, variant s is incremented by 1 (step S220), and the process returns to step S204.

If variant s is equal to or greater than smax, C_min and a standard value Cstd are compared (step S222). If C_min is smaller than Cstd, the newly requesting user is connected to the Slot-th slot at the Freq-th frequency (step S224). On the other hand, if C_min is equal to or greater than Cstd, a slot is not allocated to the newly requesting user (step S226).

It is noted that the total number of time slots, that is the multiplexing number on the side of time axis, is preliminary determined according to the system. For example, in PHS (Personal Handy phone System), N equals to 3.

ii) When the sth slot is in communication

On the other hand, if the sth slot is in communication (step S204), variant s is compared with the number smax of slots allocated to each frequency (step S218). If variant s is smaller than smax, variant s is incremented by 1 (step S220), and the process proceeds to step S204.

If the value of variant s is equal to or greater than the maximum number smax of slots, C_min and Cstd are compared (step S222). If C_min is smaller than Cstd, the newly requesting user is connected to the Slot-th slot at the Freq-th frequency by path multiplex connection (step S224). On the other hand, if C_min is equal to or greater than Cstd, a slot is not allocated to the newly requesting user (step S226).

The above described operation of channel allocation device 1050 enables channel allocation while effectively utilizing empty channels since allocation of a channel (a slot) to the newly requesting user is determined in accordance with a cross correlation value of the reception signal vector of the predetermined U wave and the reception signal vector of the newly requesting user, so that communication may be enabled even when the U wave level of the user in communication with the other base station is high.

Second Embodiment

A structure of a transmission/reception system of a base station for PDMA according to the second embodiment is the same as transmission/reception system 1000 basically shown in FIG. 1, except for the following points.

First, a reception signal power calculator 1030 calculates reception signal power for each slot in accordance a reception signal coefficient vector of the U wave for each user derived from reception signal coefficient vector calculator 1020 and that for each empty slot, as will later be described. Further, memory 1040 stores and holds the reception signal coefficient vector and reception signal power for each user and for each empty slot. In addition, channel allocation device 1050 performs channel allocation in accordance with the reception signal coefficient vector and reception signal power held in memory 1040.

More specifically, as will later be described, not only a table of the reception signal coefficient vectors of the U wave for empty channels but also a table of the U wave levels (reception signal power of the U wave) are stored in memory 1040.

As in the first embodiment, the values of the reception signal coefficient vectors and reception signal power held in the above mentioned memory 1040 are as necessary.

Figure 7:
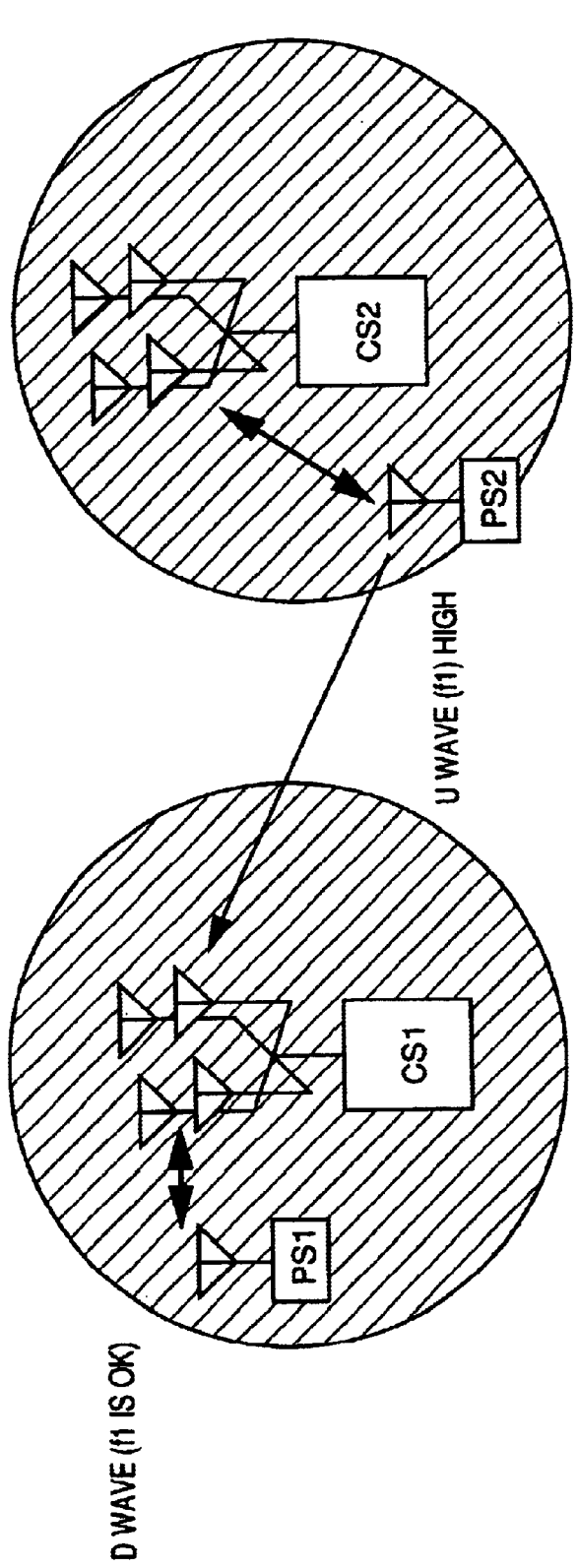
FIG. 7 is a schematic diagram shown in conjunction with a channel allocation method according to a second embodiment of the present invention.

FIG. 7 is a schematic diagram shown in conjunction with a channel allocation method according to the second embodiment of the present invention.

At base station CS1 provided with the transmission/reception system of the second embodiment, the reception signal vector of the U wave coming to the station and the U wave level are preliminary measured at all frequencies allowing connection, and a table is produced.

Base station CS1 measures reception signal vector of user PS1 newly requesting connection with respect to the base station, and allocates a channel of which cross correlation value of reception signal vectors and the D/U ratio are equal to or smaller a prescribed value, to newly requesting user PS1.

Such channel allocation enables user PS1 to communicate with base station CS1 using the channel if a magnitude of cross correlation of the reception signal coefficient vector of the D wave from newly requesting user PS1 to base station CS1 and the reception signal coefficient vector of the U wave from user PS2 to base station CS1 is small even when there is a user PS2 who is in communication with the other base station CS2 near base station CS1 and the U wave level caused by user PS2 is high.

In other words, when channel allocation is performed in accordance only with the D/U ratio, the channel that is not subjected to channel allocation can also be used, whereby usability of the channels increases. Further, since the channel to be connected is selected in accordance with the U wave level, a better communication quality is ensured.

[Operation of Reception Signal Power Calculating Device 1030]

Figure 16:
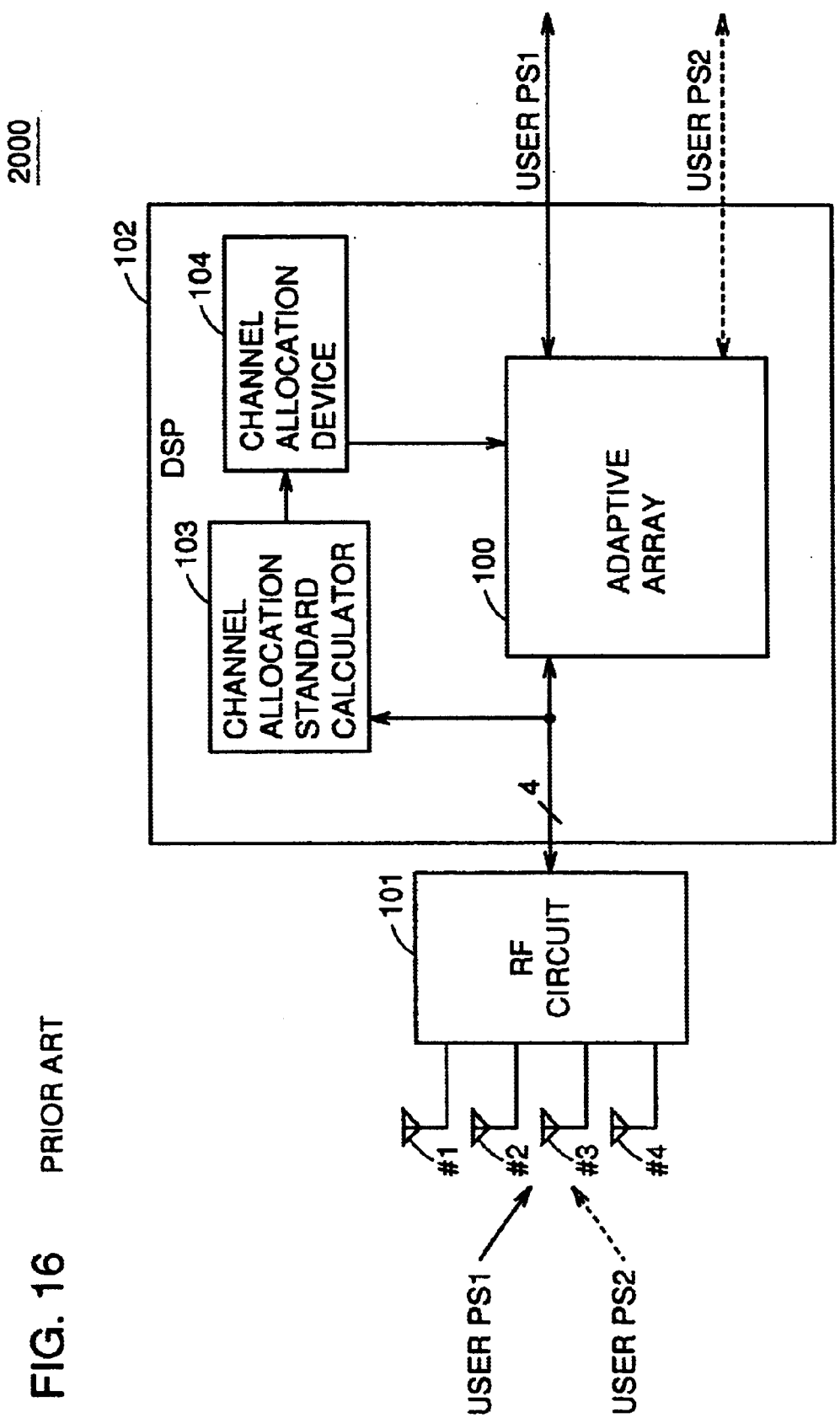
FIG. 16 is a schematic block diagram showing a transmission/reception system 2000 of a conventional base station for PDMA.

Now, the calculation of the reception signal power performed by the above mentioned reception signal power calculating device 1030 will be described. As in the conventional example described with reference to FIGS. 16 and 17, assume that there are four antenna elements for simplification of description.

If the reception signal coefficient vector calculated in accordance with equation (20) is used, for example, the reception signal power from user PS1 can be calculated by the following equation (21).

$$P_1 = H_1^2/N = (h_{11}^2 + h_{21}^2 + h_{31}^2 + h_{41}^2)/N \tag{21}$$

More specifically, if there are N antenna elements, generally, the reception signal power from the ith user PSi can be obtained by the following equation (22).

$$P_i = H_i^2/N = (h_{11}^2 + h_{21}^2 + \ldots + h_{Ni}^2)/N \tag{22}$$

Further, if the reception signal coefficient vector is measured for the empty slot, the U wave level with respect to base station CS1 can be measured in accordance with the measured reception signal coefficient vector.

[Production of Table of Reception Signal Coefficient Vector of U Wave and U Wave Level]

Figure 8:
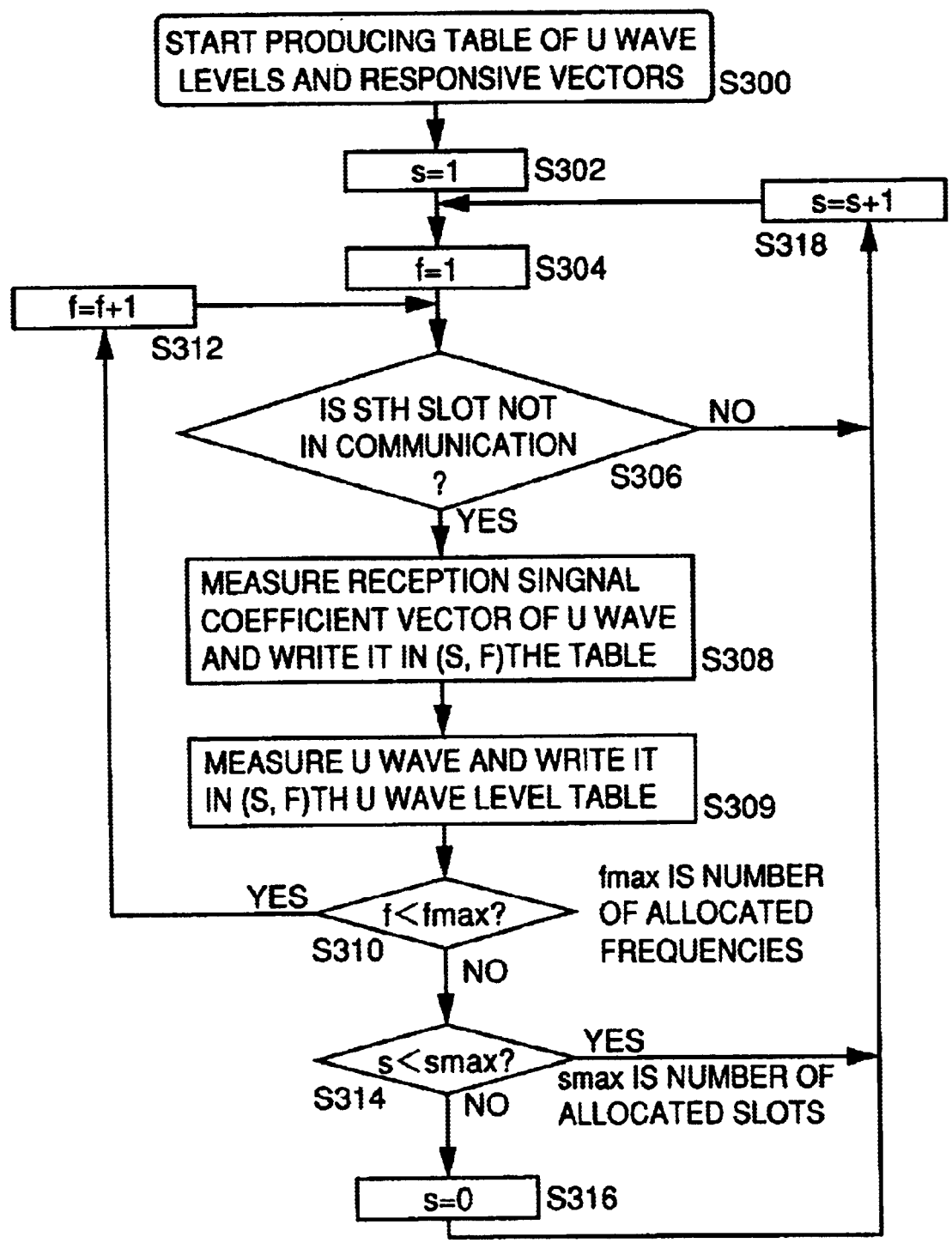
FIG. 8 is a timing chart shown in conjunction with a process of producing a table of reception signal coefficient vectors of the U wave and U wave levels.

FIG. 8 is a timing chart shown in conjunction with a process of producing a table related to the reception signal coefficient vector of the U wave and the U wave level.

The process differs from the process of producing the table related to the reception signal coefficient vector of the U wave of the first embodiment shown in FIG. 4 in that a process of producing a table of the (s, f)th U wave level (step S309) in accordance with the measured reception signal coefficient vector of the U wave (step S309) is inserted after the process of measuring the reception signal coefficient vector of the U wave level (step S308). The other parts of the process are the same as those of the process of producing the table related to the reception signal coefficient vector of the U wave according to the first embodiment shown in FIG. 4. Thus, description thereof will not be repeated.

[Operation of Channel allocation device 1050]

Figure 9:
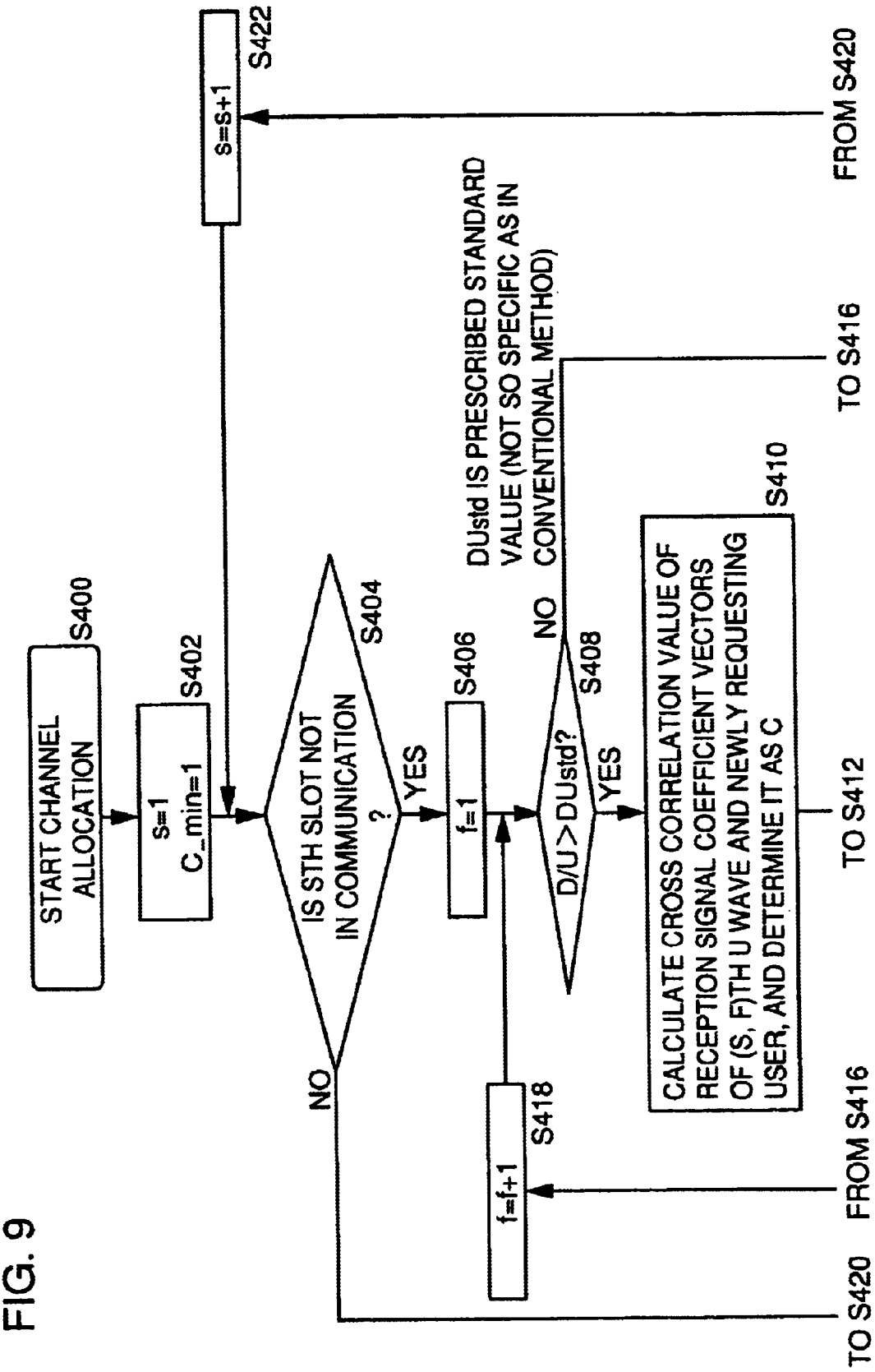
FIG. 9 is a first flow chart shown in conjunction with an operation of channel allocation device 1050 according to a second embodiment.
Figure 10:
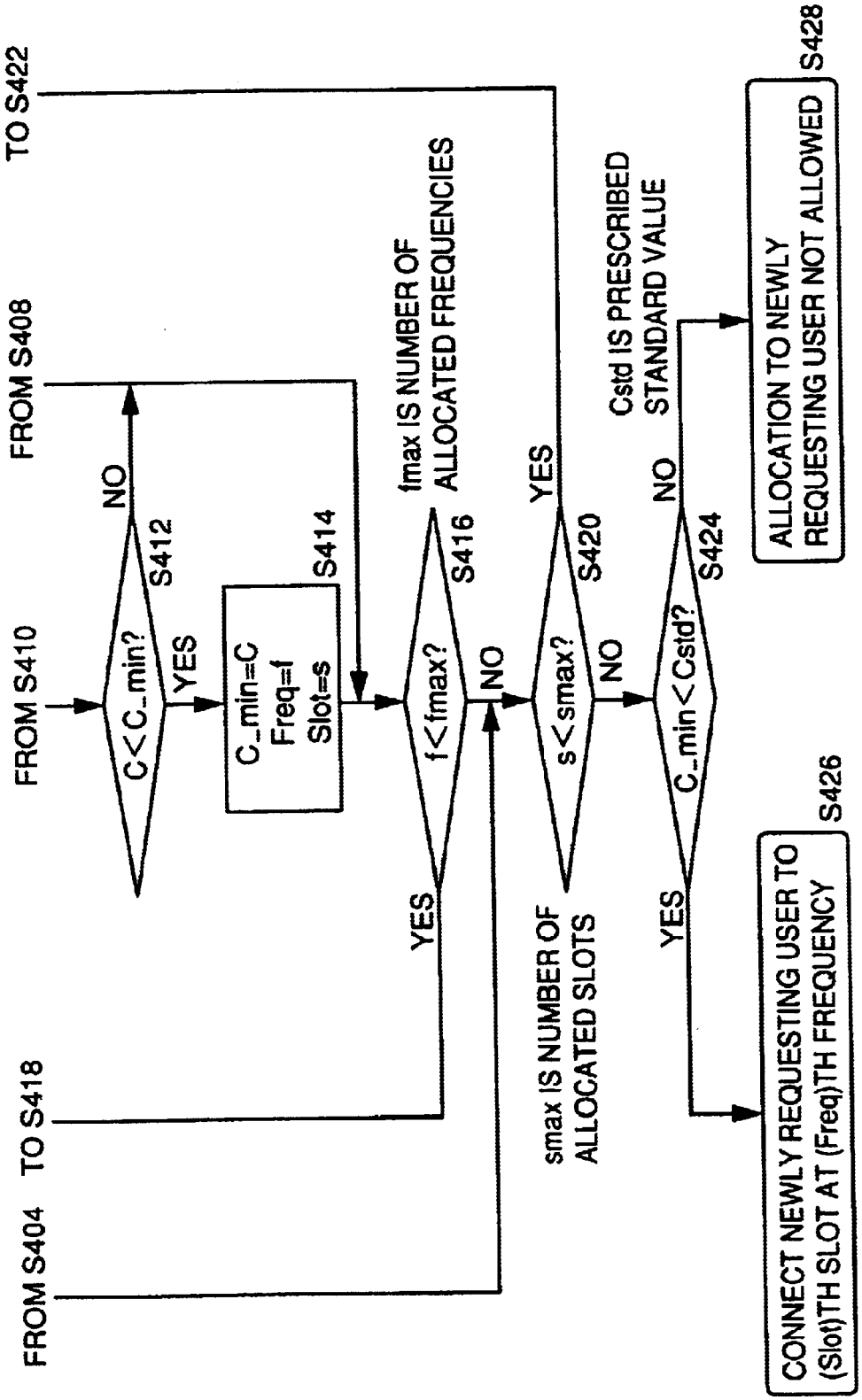
FIG. 10 is a second flow chart shown in conjunction with the operation of channel allocation device 1050 according to the second embodiment.

FIGS. 9 and 10 are flow charts shown in conjunction with the operation of channel allocation device 1050 shown in FIG. 1. Referring to FIGS. 9 and 10, when a channel allocation operation is started (step S400), channel allocation device 1050 initializes a value of a pointer variant s at 1, indicating a time slot that is possibly subjected to channel allocation (step S402).

i) When the sth slot is not in communication

When the sth slot is not in communication (step S404), pointer variant f indicating a frequency which is possibly used for connection is reset at 1 (step S406).

Figure 13:
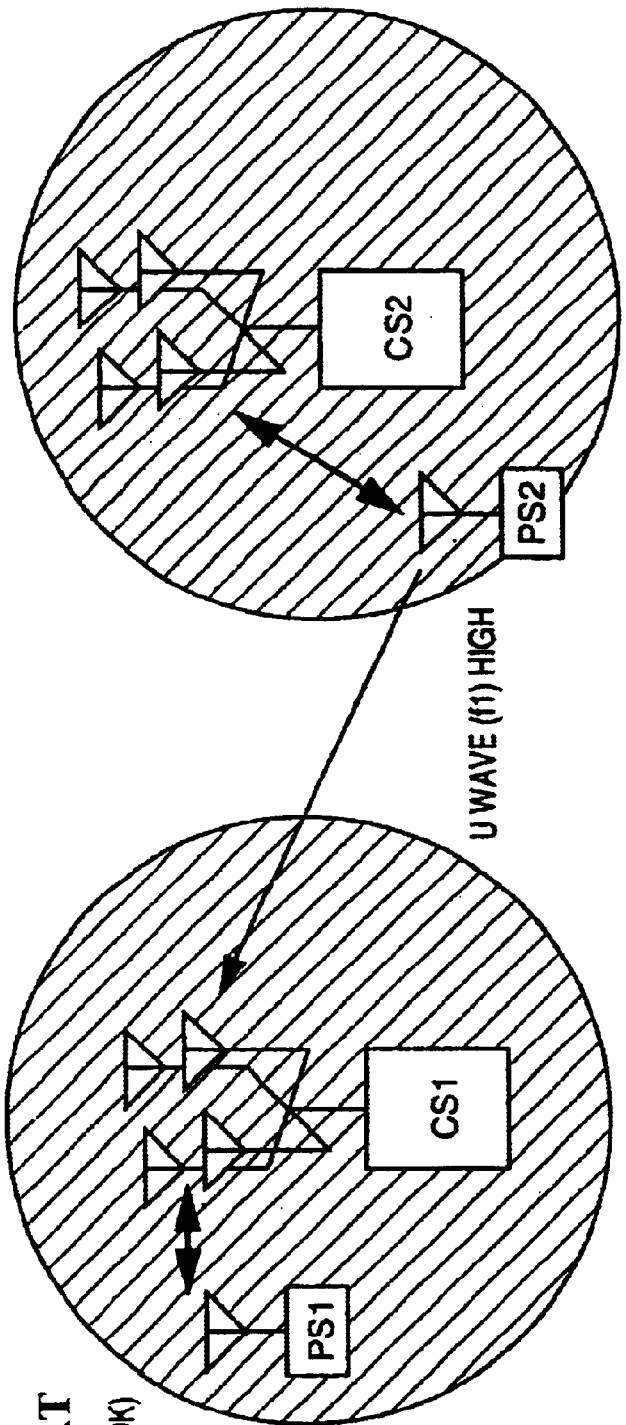
FIG. 13 is a schematic diagram shown in conjunction with the case where the U wave level is too high to enable connection of the newly requesting user in a conventional portable telephone system.
Figure 14:
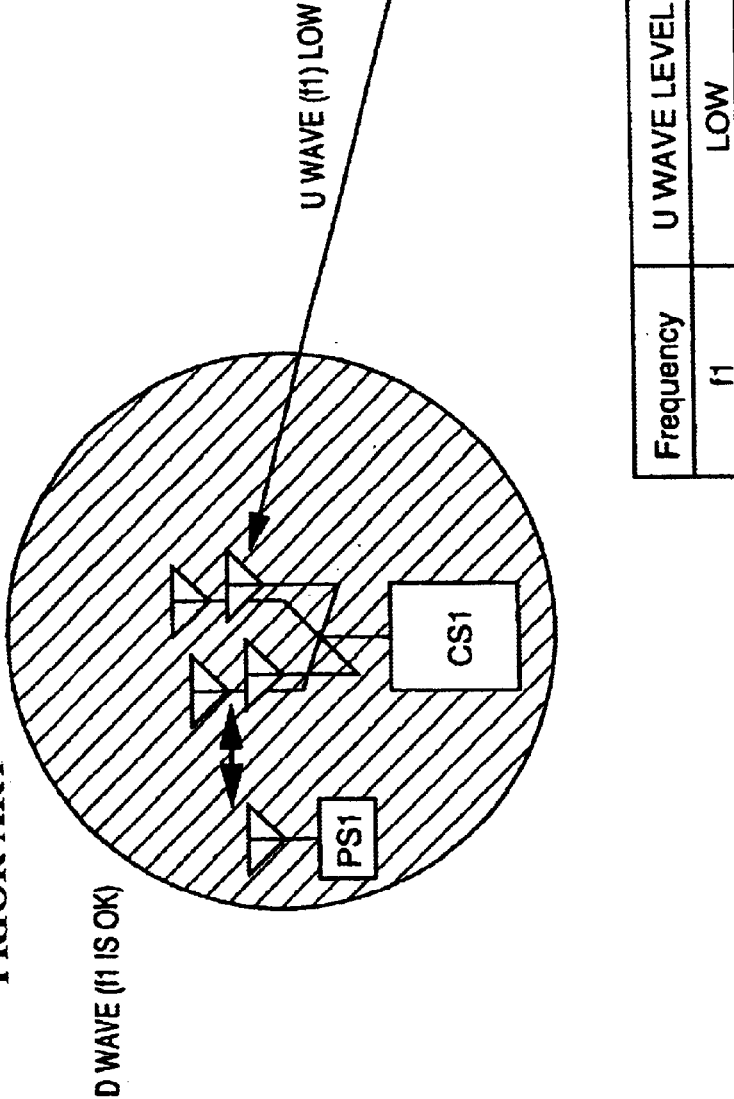
FIG. 14 is a schematic diagram shown in conjunction with the case where the U wave level is low enough to enable connection of the newly requesting user in the conventional portable telephone system.
Figure 15:
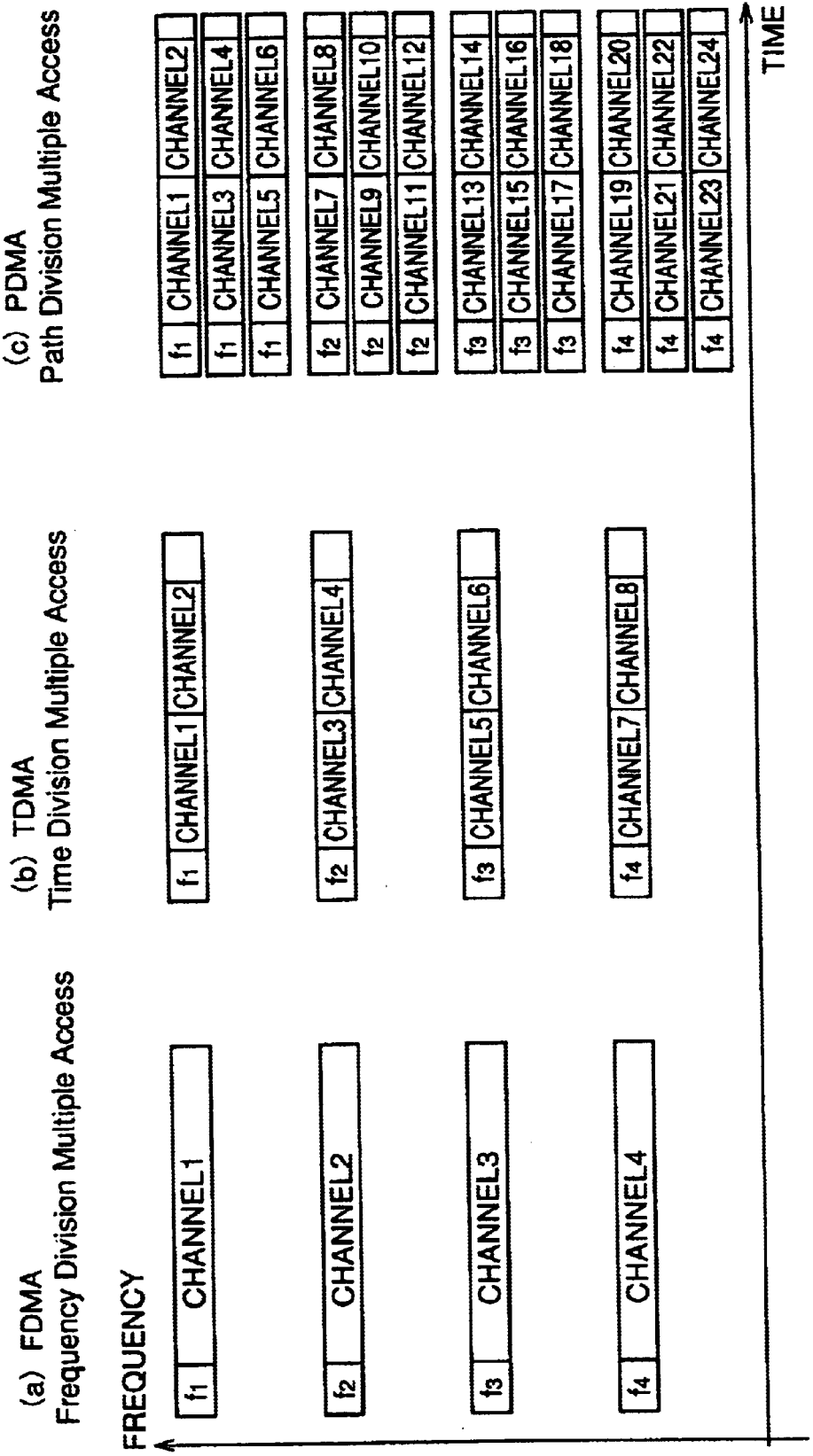
FIG. 15 is a diagram showing arrangements of channels in various communication systems.

Successively, a D/U ratio of the (s, f)th slot is compared with a prescribed standard value DUstd (step S408). Here, as will later be described, a cross correlation value of reception signal coefficient vectors of the U wave and the newly requesting user is considered. Accordingly, standard value DUstd may not be so specific as in the conventional case described with reference to FIGS. 13 and 14.

If the D/U ratio is greater than DUstd, cross correlation value C of reception signal coefficient vector $UH_{(s,f)}$ of the U wave for the (s, f)the slot and reception signal coefficient vector Hn of the newly requesting user is calculated in accordance with the equation similar to that of the first embodiment (step S410).

Then, cross correlation value C and variant C_min are compared (step S412).

If cross correlation value C is smaller than variant C_min (step S412), C_min is replaced by cross correlation value C, a value of pointer variant f indicating a frequency to be used for connection is input as variant Freq, and a pointer variant s indicating a slot to be connected is input as variant Slot (step S414). On the other hand, if cross correlation value C is equal to or greater than C_min, (step S412), successively the process returns to step S408.

When cross correlation value C is smaller than C_min (step S412), if pointer value f is smaller than the number fmax of allocated frequencies (step S416), variant f is incremented by 1 (step S418) and the process returns to step S408.

If pointer variant f is equal to or greater than number fmax of allocated frequencies (step S416), variant s is compared with number smax of the slots allocated to each frequency (step S420). If variant s is smaller than the maximum number smax of the slots, variant s is incremented by 1 (step S422), and the process returns to step S404.

If variant s is equal to or greater than maximum number smax of slots, C_min and standard value Cstd are compared (step S424). If C_min is smaller than Cstd, the newly requesting user is connected to the Slot-th slot at the Freq-th frequency by path multiplex connection (step S426). On the other hand, if C_min is equal to or greater than Cstd, a slot is not allocated to the newly requesting user (step S428).

ii) When the sth slot is in communication

If the sth slot is in communication (step S404), variant s is compared with the maximum number smax of the slots allocated to each frequency (step S420). If variant s is smaller than smax, variant s is incremented by 1 (step S422), and the process returns to step S404.

If variant s is equal to or greater than smax, C_min and Cstd are compared (step S424). If C_min is smaller than Cstd, the newly requesting user is connected to the Slot-th slot at the Freq-th frequency (step S426). On the other hand, if C_min is equal to or greater than Cstd, a slot is not allocated to the newly requesting user (step S428).

The above described operation of channel allocation device 1050 enables channel allocation while effectively utilizing empty channels since allocation of a channel (a slot) to the newly requesting user is determined in accordance with a cross correlation value of the reception signal vector of the preliminary measured U wave and the reception signal vector of the newly requesting user as well as with the D/U ratio, so that communication may be enabled even when the U wave level of the user in communication with the other base station is high. In addition, a good communication quality is ensured as the connection channel is selected in accordance with the U wave level.

Modification of Second Embodiment

Figure 11:
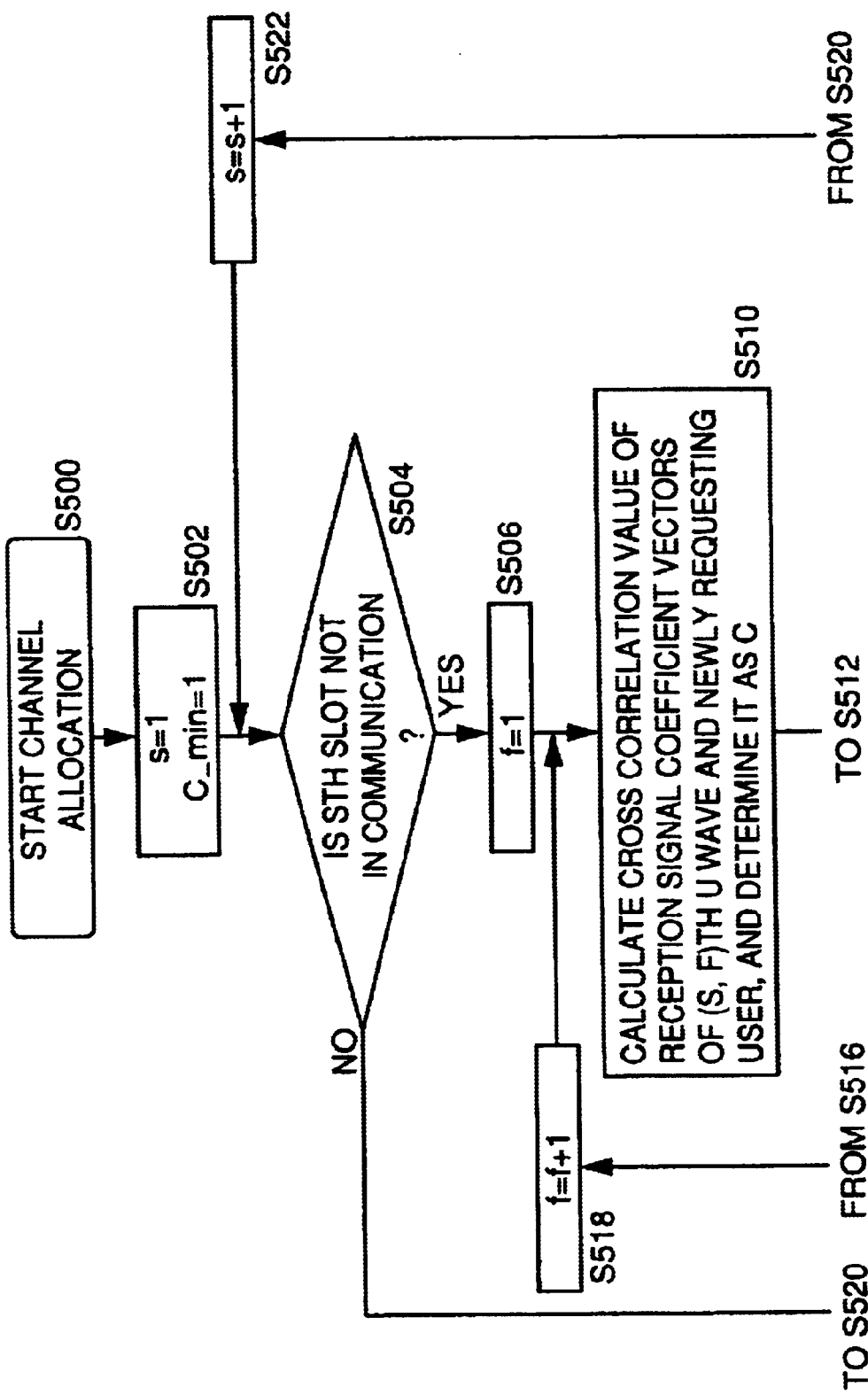
FIG. 11 is a first flow chart shown in conjunction with an operation of channel allocation device 1050 according to a modification of the second embodiment.
Figure 12:
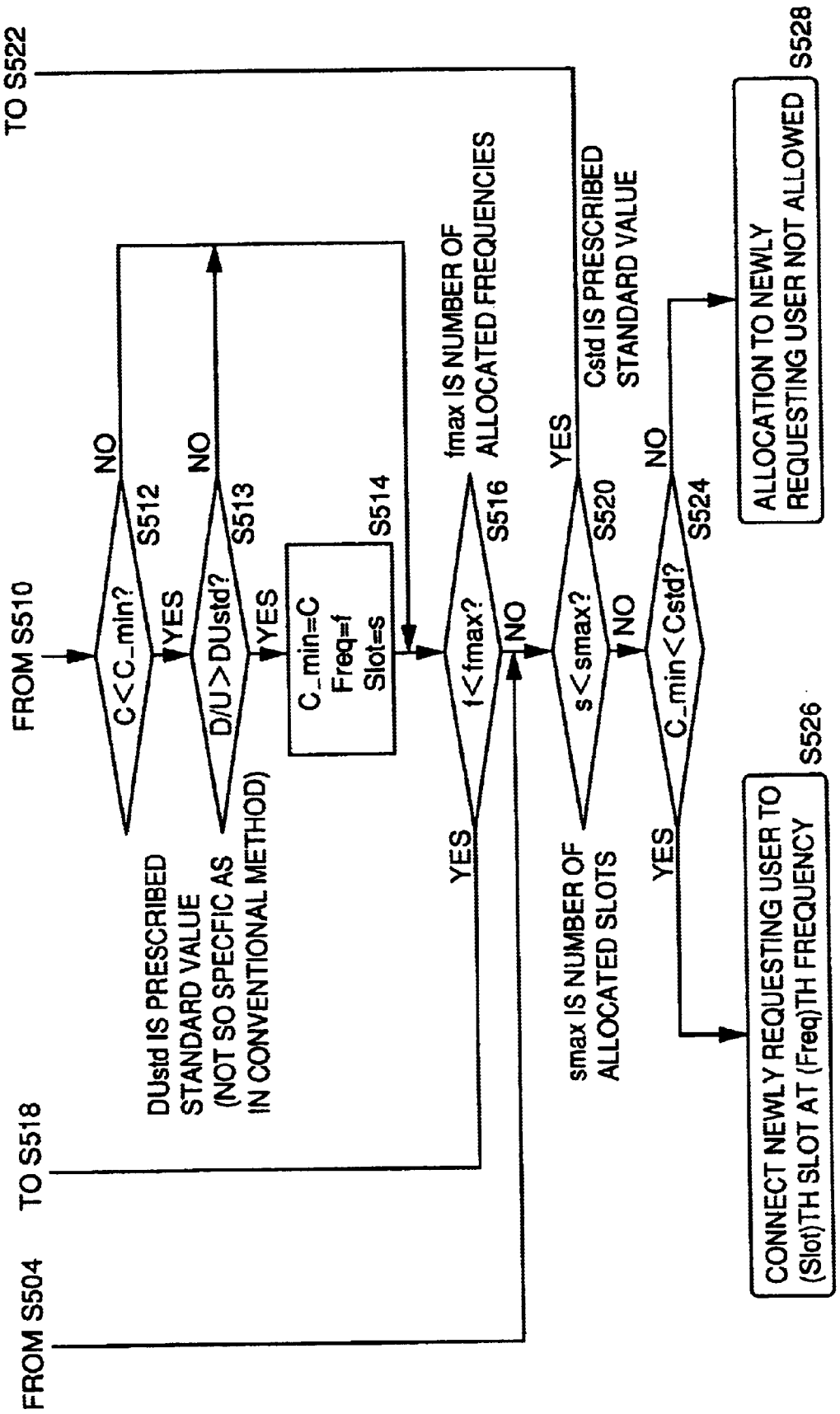
FIG. 12 is a second flow chart shown in conjunction with the operation of channel allocation device 1050 according to a modification of the second embodiment.

FIGS. 11 and 12 are flow charts shown in conjunction with a modification of the operation of channel allocation device 1050 according to the second embodiment shown in FIGS. 9 and 10.

The flow charts of FIGS. 11 and 12 are different from those of the FIGS. 9 and 10 in that a step (step S513) of comparing the D/U ratio with a prescribed standard value DUstd is performed after calculating cross correlation value C of the reception signal vector of the U wave for the (s, f)the slot and the reception singal vector of the newly requesting user (step S510) and comparing cross correlation value C with C_min (step S512).

The other parts of the process are basically the same as those of the operation of channel allocation device 1050 according to the second embodiment shown in FIGS. 9 and 10. Thus, description thereof will not be repeated.

Such an operation enables channel allocation while effectively utilizing empty channels since allocation of a channel (a slot) to the newly requesting user is determined in accordance with a cross correlation value of the reception signal vector of the preliminary measured U wave and the reception signal vector of the newly requesting user as well as with the D/U ratio, so that communication may be enabled even when the U wave level of the user in communication with the other base station is high. In addition, a good communication quality is ensured as the connection channel is selected in accordance with the U wave level.

It is noted that, in the foregoing description, a magnitude of cross correlation of the U wave and the reception wave from the newly requesting user is determined in accordance with the cross correlation value of the reception signal vectors. However, the present invention is not necessarily limited to this and, alternatively, a magnitude of cross correlation of the U wave and the reception wave from the newly requesting user may be determined in accordance with a difference in cross correlation value or arrival direction of weight vectors.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of allocating transmission channels for multiple connection to a base station having array antennas to respective terminal devices in response to connection requests from a plurality of terminal devices, comprising the step of measuring a reception signal coefficient vector of a U wave from another cell for preliminary multiplexed slot and producing a table of said U wave; and the step of allocating said transmission channel from said empty transmission channels to a user newly requesting connection in accordance to a magnitude of cross correlation value of a reception signal of said U wave and a reception signal from said newly requesting user, wherein said transmission channel includes a plurality of slots multiplexed in directions of frequency and time axis, each of said slot has a plurality of path-divided channels, and said step of allocating channels includes the step of determining a connectable empty channel in accordance with said cross correlation value of a reception signal coefficient vector of said U wave and a reception signal vector from said newly requesting user for each of said slots, wherein said cross correlation value C of a reception signal coefficient vector $UH_{(s,f)}$ of said U wave for the (s,f)th slot and a reception signal coefficient vector Hn of said newly requesting user is calculated in accordance with a following equation:

$$C=|(UH_{(s,f)} \cdot Hn)|/(|UH_{(s,f)}| \cdot |Hn|)$$

where $(UH_{(s,f)} \cdot Hn)$ represents an inner product of vectors $UH_{(s,f)}$ and Hn and $|UH_{(s,f)}|$ and $|Hn|$ respectively represent magnitudes of vectors $UH_{(s,f)}$ and Hn.

2. A method of allocating transmission channels for multiple connection to a base station having array antennas to respective terminal devices in response to connection requests from a plurality of terminal devices, comprising the step of measuring a reception signal coefficient vector and a level of a U wave from another cell for a preliminary multiplexed slot; and the step of allocating said transmission channel to a user newly requesting connection from said empty transmission channels in accordance with a magnitude of cross correlation of a reception signal of said U wave and a reception signal from said newly requesting user as well as with a ratio of said U wave level and a reception signal level of said newly requesting user, wherein said transmission channel includes a plurality of slots multiplexed in directions of frequency and time axis, each of said slots has a plurality of path-divided channels, and said step of allocating channels including the step of determining a connectable empty channel in accordance with a cross correlation value between a reception signal coefficient vector of said U wave and a reception signal vector of said newly requesting user as well as with a ratio of said U wave level and said reception signal level for each of said slots, wherein said cross correlation value C of a reception signal coefficient vector $UH_{(s,f)}$ of said U wave for the (s,f)th slot and a reception signal coefficient vector Hn of said newly requesting user is calculated in accordance with a following equation $$C=|(UH_{(s,f)} \cdot Hn)|/(|UH_{(s,f)}| \cdot |Hn|)$$

where $(UH_{(s,f)} \cdot Hn)$ represents an inner product of vectors $UH_{(s,f)}$ and Hn and $|UH_{(s,f)}|$ and $|Hn|$ respectively represent magnitudes of vectors $UH_{(s,f)}$ and Hn.

3. A radio apparatus for performing path-divided multiple connection with respect to a plurality of terminal devices, comprising:

array antennas;

a plurality of reception signal separating portions for separating in real time reception signals by multiplying reception weight vectors corresponding to said terminal devices by said reception signals from said adaptive arrays;

a reception signal coefficient vector calculating portion for measuring reception signal coefficient vectors of a U wave from another cell and a reception wave from each terminal device for multiplexed slots, wherein the timing of measuring said reception signal coefficient vector of said U wave is different from that of said reception wave;

a storing portion storing a table of said reception signal coefficient vector of said U wave; and a channel allocating portion allocating a transmission channel from empty transmission channels to a newly requesting user in accordance with a cross correlation value of a reception signal coefficient vector from said newly requesting user, wherein said cross correlation value C of a reception signal coefficient vector $UH_{(s,f)}$ of said U wave for the (s,f)th slot and a reception signal coefficient vector Hn of said newly requesting user is calculated in accordance with a following equation $$C=|(UH_{(s,f)} \cdot Hn)|/(|UH_{(s,f)}| \cdot |Hn|)$$

where $(UH_{(s,f)} \cdot Hn)$ represents an inner product of vectors $UH_{(s,f)}$ and Hn and $|(UH_{(s,f)}|$ and $|Hn|$ respectively represent magnitudes of vectors $UH_{(s,f)}$ and Hn.

4. A radio apparatus for performing path-divided multiple connection with respect to a plurality of terminal devices, comprising:

array antennas;

a plurality of reception signal separating portions for separating portions for separating in real time reception signals by multiplying reception weight vectors corresponding to said terminal devices by said reception signals from said adaptive arrays;

a reception signal coefficient vector calculating portion for measuring reception signal coefficient vectors of a U wave from another cell and a reception wave from each terminal device for multiplexed slots, wherein the timing of measuring said reception signal coefficient vector of said U wave is different from that of said reception wave;

a reception signal power calculating portion deriving a reception signal power for said each terminal device and a reception signal power of said U wave;

a storing portion storing a table of said reception signal coefficient vector of said U wave and a table of said reception signal power of said U wave; and a channel allocating portion allocating a transmission channel from empty transmission channels to a newly requesting user in accordance with a cross correlation value of a reception signal coefficient vector from said newly requesting user as well as with a ratio of a U wave power level and a reception signal power level of said newly requesting user.

5. The radio apparatus according to claim 4, wherein a cross correlation value C of a reception signal coefficient vector $UH_{(s, f)}$ of said U wave for the (s, f)th slot and a reception signal coefficient vector Hn of said newly requesting user is calculated in accordance with a following equation $$C=|(UH_{(s, f)} \cdot Hn)|/(|UH_{(s, f)}| \cdot |Hn|)$$

where $(H_{(s, f)} \cdot Hn)$ represents an inner product of vectors $H_{(s, f)}$ and Hn, and $|H_{(s, f)}|$ and $|Hn|$ respectively represent magnitudes of vectors $H_{(s, f)}$ and Hn.

* * * * *